May 11, 1965  E. GRANBERG  3,182,442
SAW CHAIN SERVICE TOOL
Filed Feb. 8, 1963
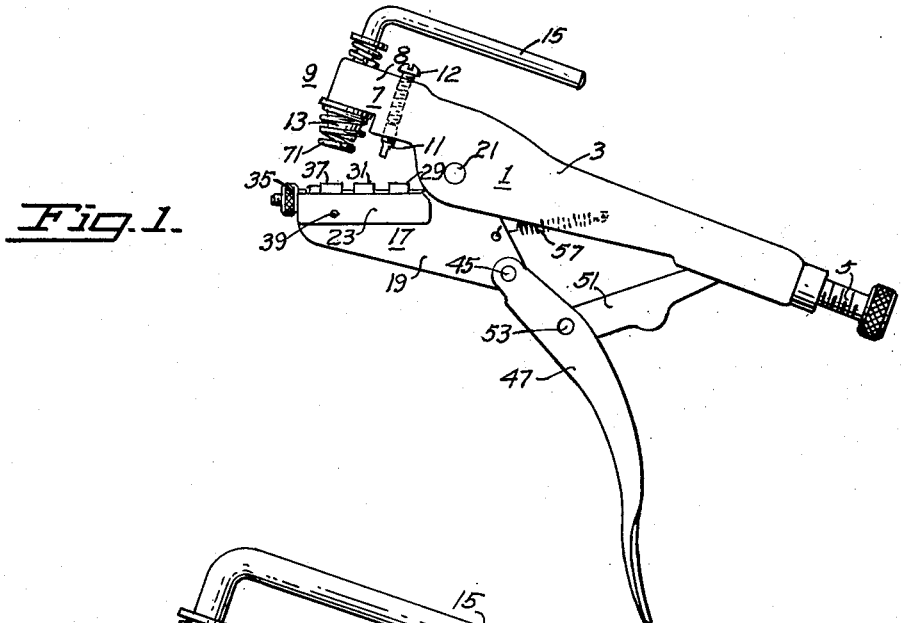
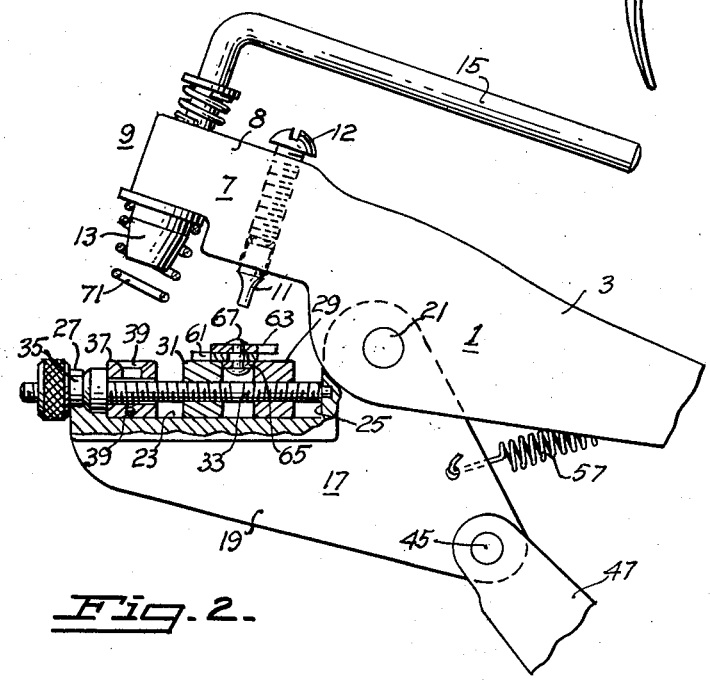
INVENTOR.
ELOF GRANBERG
BY
HIS ATTORNEYS

United States Patent Office 3,182,442
Patented May 11, 1965

3,182,442
SAW CHAIN SERVICE TOOL
Elof Granberg, 2659 Mira Vista Drive, Richmond, Calif.
Filed Feb. 8, 1963, Ser. No. 257,125
3 Claims. (Cl. 59—7)

My invention relates to chain saws and more particularly to a tool for servicing the saw chain of such a saw.

In the use of chain saws, it frequently happens that a cutter tooth or some other component part of the chain becomes damaged to the extent of necessitating replacing the same or buying a new saw chain. Where such component is replaceable, the cost of repairing a chain represents but an insignificant part of the cost of a new chain and is, therefore, the more economical solution to the problem.

A saw chain is made up of drive links, cutter teeth and side straps, freely held by rivets. The service chain, therefore, requires first, breaking it by removing a rivet or two, to eliminate the faulty or damaged cutter tooth or drive link, and following replacement of a new one, then spinning new rivets or the old rivets back into position.

While certain tools have been developed for this purpose, the present invention offers definite improvements over these and has for its objects:

(1) To provide a novel and improved tool for servicing of saw chains;

(2) To provide a novel and improved tool for servicing of saw chains, which tool shall provide a more secure support for a saw chain being serviced;

(3) To provide a novel and improved tool for punching rivets from a saw chain in the servicing of such a chain, which tool will enable greater mechanical advantage in the initial portion of such operation when the greatest force is required;

(4) To provide a novel and improved tool for servicing of saw chains, which tool will accommodate saw chains of different make and size;

(5) To provide a novel and improved tool for servicing of saw chains, which tool will permit of a smoother and more efficient operation in the spinning of rivets, to secure the component parts in functional relationship to each other;

(6) To provide a novel and improved tool for servicing of saw chains, which tool may be accurately adjusted with respect to the chain rivets to be operated on;

(7) To provide a novel and improved tool for servicing of saw chains, which tool enables all operations on a chain to be conveniently handled by one individual;

(8) To provide a novel and improved tool for servicing of saw chains, components of which tool are replaceable or adjustable to effect a long tool life.

Additional objects of my invention will be brought out in the following description of a preferred embodiment of the same, taken in conjunction with the accompanying drawings, wherein:

FIG. 1 is a side view in elevation of the tool of the present invention; and

FIG. 2 is a fragmentary enlarged view of the tool of FIG. 1, partly in section, to depict important details.

Referring to the drawings for details of my invention in its preferred form, the tool of the present invention comprises a lever 1 including a hand grip 3, which at its end carries a longitudinally mounted adjusting screw 5, and at the other end of the lever, the lever terminates in a punch head assembly 7 involving a stem 8 having a rivet spinner 9 rotatably mounted in the end of the stem, with the rivet punch 11 at an intermediate location on the lower side of the stem, where it is frictionally retained in a bore through the stem, and rendered adjustable by an adjusting screw 12 threadedly entering the bore from the upper end thereof.

The rivet spinner 9 includes at one end, a spinner head 13, and at its other end, a handle 15 for manually rotating the spinner head. The face end of the spinner head preferably is ground or recessed along a diameter thereof to more effectively perform its function in spinning a rivet.

Below the punch head assembly is an anvil assembly 17 for cooperation with the punch head assembly in the servicing of a saw chain. This anvil assembly includes a jaw 19 pivotally secured to the lever 1 by a pivot pin 21 intermediate the hand grip 3 and the punch head assembly mounting stem 8, and extending slightly beyond the free end of the mounting stem.

The anvil supporting edge of the jaw is preferably in the form of a trough 23, bounded at its inner end by a wall 25 adjacent the pivot pin 21, and at its outer end, the trough is closed by an end wall 27 recessed at its upper edge.

The trough is adapted to receive a pair of anvil components 29 and 31, which together form the anvil for the rivet punch 11. These are adjustably mounted on an adjusting screw 33 having a peripherally grooved head 35, and extending the length of the trough with its inner end journalled in the wall 25 and its grooved head 35 resting in the notched wall 27. This adjusting screw is provided with a right hand threaded section and a left hand threaded section, the point at which the right and the left hand threaded section approach each other, preferably lying on the axis of the rivet punch 11 when the punch is moved toward the jaw.

With one of the anvil components provided with a right hand threaded passage and the other, a left hand threaded passage, and with both threadedly mounted on the adjusting screw symmetrically with respect to the axis of the rivet punch, it will be apparent that any item grasped between the anvil components, will always lie on the axis of the rivet punch, regardless of the adjustment of the anvil.

By making these anvil components of rectangular block form, each will have a number of edges adaptable for use in gripping and supporting the work, and by removably supporting these anvil components on the adjusting screw, the anvil components may be removed and reversed or turned over, to present fresh sharp edges, thus making at least four edges of each component available for gripping and supporting the work.

Also disposed in the trough 23 is a rivet spinning anvil 37, for which purpose it is provided with a recess 39 in the upper surface thereof to receive the head of a rivet and stabilize the same during spinning of a head at its other end.

This anvil is fixed as to its location in the trough, on the axis of the rivet spinner head 13 when the spinner head and anvil are brought together.

In order that such disposal of the rivet spinner anvil not interfere with the functioning of the adjusting screw 33 and at the same time permit of removal of such screw, the rivet spinner anvil is provided with a passageway therethrough of a diameter to permit free passage of the adjusting screw, and is removably secured in its functioning position by passing through the rivet spinner anvil and the side walls of the trough in which it is located, a removable pin 39. When so fixed in position, the rivet spinner anvil serves the added function of removably anchoring the adjusting screw 33 and associated rivet punch anvil components 29 and 31.

Pivotally secured to the jaw 19 by a pivot pin 45 located substantially below the pivot pin 21 on which the jaw pivots, is a second handgrip 47, to function in cooperation with the first handgrip 3 in bringing the punch head assembly and the anvil assembly together.

Toward this end, a connecting lever 51 is connected at one end by a pin 53 to the second handgrip at an intermediate point thereon, while at its other end, this connecting lever hingedly connects to the inner end of the adjusting screw 5, mounted in the end of the first handgrip. A tension spring 57, anchored at one end to the first handgrip at an intermediate point thereof, connects at its other end to the jaw 19, at a point between the jaw pivot pin 21 and the second handgrip pivot pin 45, such spring, under tension, serving to restore the jaw to its "open" position with respect to the punch head assembly.

Saw chains, as previously indicated, are of different sizes and design, but in general such a saw chain will include drive links 61, cutter teeth 63, and side straps 65, all held together by solid rivets 67, the rivets in most chains being shoulder rivets, against the shoulders of which, the drive links and side straps are held by the rivet heads.

In employing the tool of the present invention in the servicing of a saw chain, the chain is placed across the two component anvil 29–31, which is adjusted to comfortably receive the side strap 65 between the anvil components, and the punch 11 is then forced down against the proximate rivet head with sufficient pressure to drive the rivet out of the chain. If an entire cutter tooth or drive link is to be removed, a second rivet will similarly be driven out, so as to free such tooth or link from the chain for substitution of a new element.

With new elements substituted for the damaged ones, and a new rivet in the aligned openings of the chain elements to be riveted, and the chain is then positioned with the preformed head of the new rivet on the spinner anvil 37, following which the spinner head 13 is brought down into pressure contact with the exposed end of the rivet to be spun.

A coil spring 71 anchored about the spinner head and extending a turn or two beyond the end of the spinner head, is adapted to engage the saw chain in advance of the spinner head and hold the loose chain components in proper engagement for riveting. While the chain is thus held, the spinner head is manually rotated while held in pressure engagement with the exposed end of the rivet to be spun, to produce a gradual flaring of the end of the rivet until maximum overturn of the rivet material is realized without binding any of the riveted components.

Aside from the punch head assembly and the anvil assembly, the tool bears considerable similarity to a tool known in the trade as a "vise grip pliers." In such tool, a pair of jaws function in place of the punch head assembly and the anvil assembly of the present invention, and manipulation of the adjusting screw 5 will cause the cooperating jaws to approach or recede from each other. By adjusting the spacing between the jaws to approach the sides of a nut or corresponding element to which the tool is to be applied, and thereafter, bringing the two handgrips toward each other, the jaws of the pliers may be locked to such element. This is the sole function of the adjusting screw 5 in the tool known as "vise grip pliers."

In the tool of the present invention, this adjusting screw performs an additional function, which is quite vital in the use of such tool. I have discovered, for example, that changes in the angular position of the connection lever 51 with rotation of the adjusting screw 5, changes the mechanical advantage of the tool. That is, as the adjusting screw is adjusted outwardly, greater leverage is offered by reason of the shallower angle which the connecting lever 51 makes with the second handgrip 47.

Accordingly, instead of threading the adjusting screw 5 all the way in, and attempting to punch out a rivet in one operation with the minimum leverage provided by such adjustment, it is possible to perform the operation in two or more steps, starting with an adjustment of the adjusting screw such as will allow but limited penetration of the punch 11 into the rivet 67, sufficient for example, to break through the spun head thereof. Since this step in the operation requires the greatest amount of pressure, it will be apparent that the tool offers the maximum leverage and therefore, maximum mechanical advantage under the conditions when most needed.

Subsequent adjustments of the screw can be made in large or small increments of adjustments as may be desirable, until the rivet is completely driven out of the chain. Similar progressive adjustments of the adjusting screw may be resorted to, if desired, in the operation of spinning a new rivet into position.

While the above-described punch head assembly and anvil assembly have been illustrated as component parts in a hand tool, these assemblies may be embodied in an arbor type tool or in other associations which can bring about the desired cooperation between such assemblies.

From the foregoing description of my invention, it will be apparent that the same fulfills all the objects of the invention, and while I have illustrated and described the same in considerable detail, I do not desire to be limited in my protection to the details so illustrated and described except as may be necessitated by the appended claims.

I claim:

1. A saw chain service tool comprising a punch head assembly including a rivet punch, an anvil assembly for supporting a saw chain to be serviced, said anvil assembly including an anvil support, a split anvil including a pair of anvil components, one having a right hand threaded passageway therein and the other a left hand threaded passageway therein, means adjustably mounting said anvil components on said anvil support for simultaneous adjustment of both components symmetrically with respect to the axis of said rivet punch, said means including a screw having a right hand threaded section and a left hand threaded section, means rotatably supporting said screw on said support below said punch head assembly with said anvil components threaded on said screw in symmetrically spaced relationship to the axis of said rivet punch, and means for rotating said screw to alter the spacing between said anvil components without changing said symmetrical relationship.

2. A saw chain service tool comprising a punch head assembly including a rivet punch and a rivet spinner, an anvil assembly for supporting a saw chain to be serviced, said anvil assembly including an anvil support, a split anvil including a pair of anvil components, means adjustably mounting said anvil components on said anvil support for simultaneous adjustment of both components symmetrically with respect to the axis of said rivet punch, and a fixed anvil affixed to said support on the axis of said rivet spinner, said fixed anvil having a recess in the side facing said rivet spinner.

3. A saw chain service tool comprising a punch head assembly including a rivet punch and a rivet spinner, an anvil assembly for supporting a saw chain to be serviced, said anvil assembly including an anvil support, a split anvil including a pair of anvil components, one having a right hand threaded passageway therein and the other a left hand threaded passageway therein, means adjustably mounting said anvil components on said anvil support for simultaneous adjustment of both components symmetrically with respect to the axis of said rivet punch, said means including a screw having a right hand threaded section and a left hand threaded section, means rotatably supporting said screw on said support below said punch head assembly with said anvil components threaded on said screw in symmetrically spaced relationship to the axis of said rivet punch, and means for rotating said screw to alter the spacing between said anvil components without changing said symmetrical relationship, and a fixed anvil affixed to said support on the axis of said rivet spinner, said fixed anvil having a recess in the side facing said rivet spinner.

(References on following page)

References Cited by the Examiner

UNITED STATES PATENTS

| | | | |
|---|---|---|---|
| 433,786 | 8/90 | Hooks | 81—166 |
| 1,248,355 | 11/17 | Lyle | 78—46 |
| 2,366,519 | 1/45 | Greenberg | 269—242 |
| 2,661,112 | 12/53 | Davis | 218—19 |
| 2,853,910 | 9/58 | Petersen | 81—368 |
| 2,881,645 | 4/59 | Kruchten | 269—242 |
| 3,063,236 | 11/62 | Cannon | 59—7 |

FOREIGN PATENTS

| | | |
|---|---|---|
| 675,797 | 5/39 | Germany. |
| 171,041 | 11/12 | Great Britain. |

WILLIAM J. STEPHENSON, *Primary Examiner.*